United States Patent [19]

Nagel et al.

[11] 4,333,418
[45] Jun. 8, 1982

[54] APPARATUS FOR THE PRODUCTION OF MAGNETIC RECORDING MEDIA IN TAPE FORM

[75] Inventors: Peter Nagel, Willstaett; Klaus Schoettle, Heidelberg; Reinrich Wittkamp, Mannheim; Karl Hauck, Maxdorf, all of Fed. Rep. of Germany

[73] Assignee: BASF Aktiengesellschaft, Ludwigshafen, Fed. Rep. of Germany

[21] Appl. No.: 135,913

[22] Filed: Mar. 28, 1980

Related U.S. Application Data

[60] Division of Ser. No. 815,929, Jul. 15, 1977, which is a continuation of Ser. No. 711,822, Aug. 5, 1976, abandoned.

[30] Foreign Application Priority Data

Aug. 6, 1975 [DE] Fed. Rep. of Germany ....... 2535092

[51] Int. Cl.$^3$ ............................................. B05C 11/02
[52] U.S. Cl. ................................. 118/106; 118/126; 118/623; 118/640
[58] Field of Search .................. 427/48; 118/640, 106, 118/126, 623, 620

[56] References Cited

U.S. PATENT DOCUMENTS 3,413,141  11/1968  Friedman ............................. 427/48

Primary Examiner—Bernard D. Pianalto
Attorney, Agent, or Firm—Keil & Witherspoon

[57] ABSTRACT

Magnetic recording media in which, following application of the magnetic dispersion to a web of tape base material, the magnetic particles are oriented in a preferred direction and the magnetic dispersion is dried to fix the magnetic particles in their oriented position. To assist the orienting action of the orientation magnet, a blanket is located between the latter and the coating device, which blanket is caused to make sliding contact with the applied magnetic layer.

4 Claims, 1 Drawing Figure

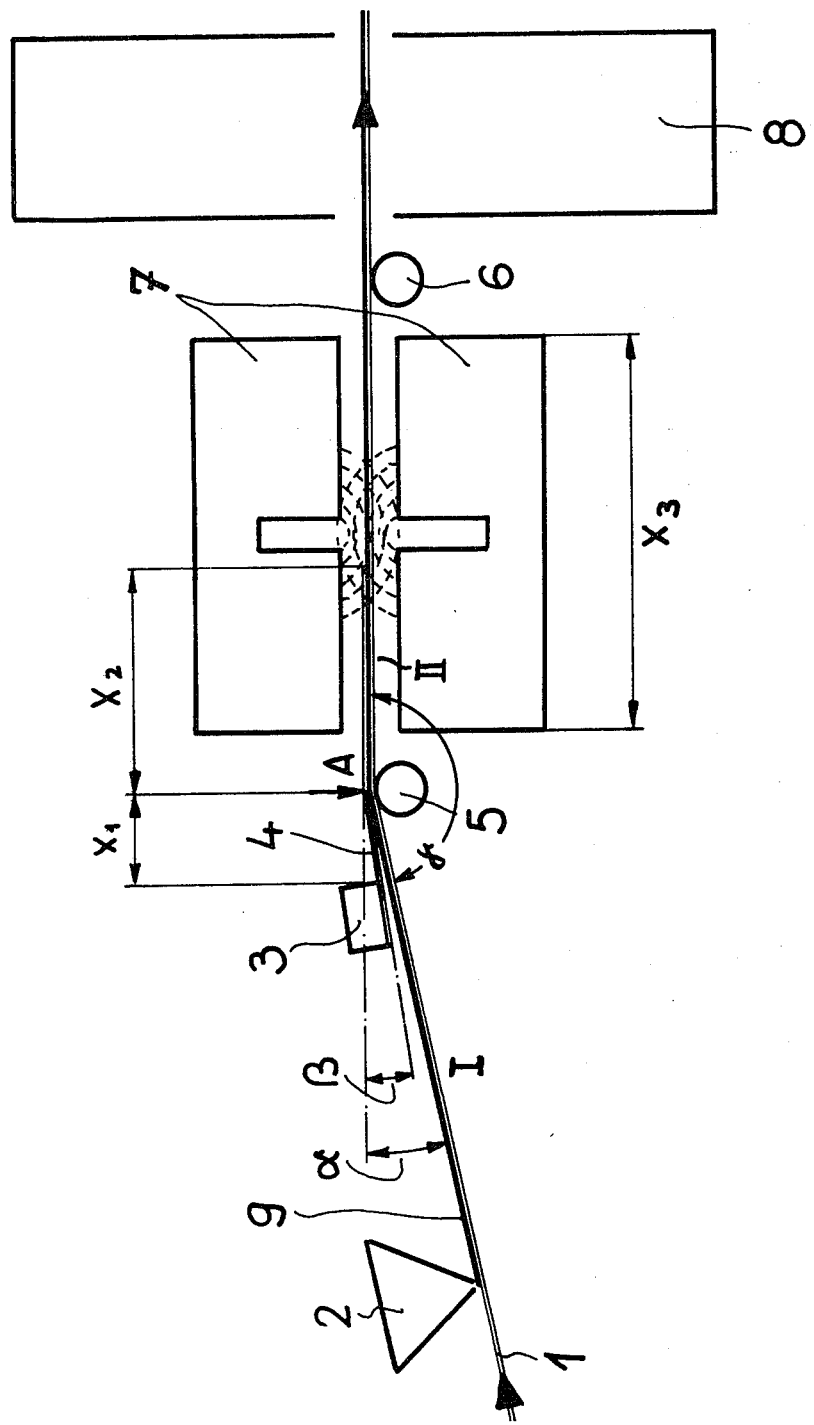

APPARATUS FOR THE PRODUCTION OF MAGNETIC RECORDING MEDIA IN TAPE FORM

This is a division of application Ser. No. 815,929, filed July 15, 1977, which, in turn, is a continuation of application Ser. No. 711,822, filed Aug. 5, 1976, now abandoned.

The present invention relates to a process and apparatus for the production of magnetic recording media in which a layer of fluid magnetic dispersion comprising a mixture of anisotropic magnetic particles in a binder and optional solvent is applied to a moving web of non-magnetizable tape base material, the magnetic particles are aligned in a preferred direction parallel to the surface of the web of tape base material, and the fluid magnetic coating is dried to fix the magnetic particles in their aligned positions.

As is well known, the recording and reproducing properties of magnetic recording media used for recording digital data, audio and video signals can be improved by orienting the magnetizable particles, particularly acicular particles such as chromium dioxide and garma-iron(III) oxide particles, in a specific direction. The acicular particles are aligned by means of a uniform magnetic field acting upon the fluid coating with their longest axes, the longest axis being the easy axis of magnetization (uniaxial shape anisotropy), parallel to the surface of the base in the direction of recording. The uniform magnetic field is usually produced by permanent magnets or DC-energized electromagnets, the lines of force of the field being parallel to the direction of recording and to the surface of the tape base. The direction of recording is for example the longitudinal direction in the case of audio tapes and approximately the transverse direction in the case of video tapes.

This alignment of the magnetic particles results in an increase in the remanent magnutization of the tape and also improves sensitivity during recording. Furthermore, output at a given value of distortion is increased, whereas the noise level of the tape remains virtually constant, i.e. the signal-to-noise ratio in increased. In saturation recording, e.g. in the case of digital data recording, the output can also be increased.

Following orientation, the magnetizable particles must, as is well known, be locked in their aligned positions by drying the fluid dispersion with the aid of heat. In this step, depending on the type of binder used, the binder containing the magnetic particles is hardened by removal of the solvent or caused to undergo crosslinking reactions.

In the orientation method disclosed in U.S. Pat. No. 2,711,901 the web of base material coated with a layer of fluid magnetic dispersion is passed at a constant rate through a uniform magnetic field of limited extension in the direction of tape motion produced by two permanent magnets whose opposed magnetic poles are of like polarity, the magnetizable acicular particles in the layer being aligned with their magnetic axes parallel to the direction of recording and to the surface of the base. After leaving the orientation field, the coated web is dried in an oven to look the magnetic particles in their oriented positions.

In the hitherto known drying methods the web of tape base material coated with a layer of fluid magnetic dispersion passes through an oven where the binder containing the magnetic particles is hardened by removal of the solvent or caused to undergo crosslinking reactions with the aid of hot air.

U.S. Pat. No. 2,796,359 describes a process and apparatus for the production of magnetic tapes in which a web of tape base is fed from an unwinding device through a coating device, a magnetizing device and a drying machine to a roll-winding machine. The magnetizing device is arranged between the coating device and the drying machine or in the rearward end of the drying machine or partly in and partly out of the rearward portion of the drying machine. Orientation of the magnetic particles in the fluid coating takes place downstream of the coating device before the particles are fixed in their oriented positions by drying. The tensile forces exerted by the feeding and take-up reels act on the web of tape base in such a way that an intervening loop of tape base is formed so that the magnetic particles trapped in this loop acquire a rolling motion which facilitates their orientation. These tensile forces exerted on the web of tape base, particularly in the case of the thin tape base materials used nowadays (thickness less than 10 $\mu$m), are very disadvantageous because they may result in mechanical deformation of the tape base; the higher the drying temperature, the greater the deformation. Such coated webs which are deformed are useless for the production of magnetic recording media. The magnets used to create the orienting field are either bar or U-shaped permanent magnets or electromagnets which are arranged below the wet of tape base. It is a disadvantage that only low orientation ratios can be obtained with such magnets because disorientation of the magnetic particles takes place at the last trailing edge of the magnet, and that an undesirable effect can be produced by such magnets which are arranged asymmetrical to the plane of the web of tape base, namely an enhancement of the recording when the tape is played in one direction, but a decrease in output when the tape is played in the reverse direction.

Furthermore, U.S. Pat. No. 3,080,319 discloses a method in which, after solidification of the binder of the magnetic layer in which the magnetic particles have already been magnetically oriented in a preferred direction, the particles are additionally mechanically oriented by stretching the tape base material in the direction of orientation of the particles, in order to produce an orientation factor of at least 1.5 by magnetic orientation alone or by mechanical stretching alone. Such a rocedure of necessity exerts a severe mechanical strain on the tape base material and consequently has the drawback that it can only be used on base material of considerable thickness and is not applicable to webs of thin base material.

It is also known to contact the surface of the still moist layer of magnetic dispersion with a smoothening blanket following coating of the base in the manufacture of magnetic tapes, by which means the surface of the magnetic layer is smoothened. The point of contact between the blanket and the magnetic layer is located downstream of a deflecting roller for the tape, which roller causes the tape to change direction from a first inclined plane to a horizontal plane. However, this point of contact is at such a distance from the magnet used for orienting the magnetic particles that a certain amount of disorientation may take place over the distance between the said magnet and the said point of contact.

It is an object of the present invention to improve orientation of the magnetic particles in magnetic layers in a simple manner.

This object is achieved according to the invention by applying mechanical forces to the magnetic particles prior to and during at least part of the time during which they magnetically oriented, which mechanical forces act in the preferred direction of magnetic orientation to improve the orienting action, the said forces being shear forces which are exerted exclusively on the magnetic layer and not on the web of base material.

The magnetic particles are hooked together by means of their microbranches, so-called dendrites, and the invention makes it possible to apply forces thereto which are sufficient to disentangle the particles to give them more freedom of movement than is possible by magnetic means alone, the action of the magnetic orientation field thus being surprisingly improved.

The apparatus according to the invention comprises a magnetic dispersion coating device and a conveying device by means of which the web of tape just coated is conveyed upwardly in an inclined plane and is caused to change direction from the said inclined plane to a horizontal plane by means of a deflecting roll, in which horizontal plane the tape is passed to the field of a magnetic orienting device and is subsequently dried in a drying apparatus, a blanket being located between the coating device and magnetic orienting device in a position in which it has sliding contact with the surface of the magnetic layer, the first line of contact between the blanket and magnetic layer, when viewed in the direction of web motion, being near said deflecting roll and the length of the blanket being so selected that it ends within the orientation field just before the zone of greatest field strength of the magnetic orienting device.

The use of an apparatus of this kind makes it possible to achieve optimum orientation ratios at low additional cost.

In a further embodiment of the invention, the angle between the two planes of transport of the conveying device is preferably from 165° to 170°.

This reduces the mechanical strain on the web and also exerts minimum strain on the magnetic layer while it is still wet.

Further details of the invention will be apparent from the following description of an embodiment of the apparatus of the invention illustrated in the accompanying drawing.

BRIEF DESCRIPTION OF THE FIGURE

The FIGURE shows an embodiment of the magnetic tape coating apparatus of the invention.

DESCRIPTION OF THE PREFERRED EMBODIMENT

A web of tape base material 1 is passed beneath a magnetic dispersion coating device, coater 2, by means of which a thin layer of fluid magnetic dispersion 9 is applied. The coated web 1 is conveyed upwardly by means of a conveying device (not shown) in a first inclined plane I and then, after a change of direction at deflecting roll 5, in a second horizontal plane II. The angle $\gamma$ between planes I and II is preferably from 165° to 170°, this corresponding to an angle $\alpha$ of from 15° to 10°. The deflecting roll 5 and the roll 6 ensure that the coated web passes the magnetic orienting device in a specific position in plane II. If the orienting device 7 consists of two horseshoe magnets located symmetrically opposite each other, as shown, the web 1 passes centrally between the magnetic poles through the uniform part of the magnetic field. Use may also be made of a single horseshoe magnet located on one side of the web, but this has the disadvantages described in the introduction.

Holding means 3 for the blanket 4 are located a short distance above plane I. The holding means 3 are located, according to the invention, upstream of the deflecting roll 5 and above the web to as to form an angle $\beta$ which should be appreciably smaller than the above angle $\alpha$ between the plane I and the horizontal. In the embodiment shown, the preferred range of the angle $\beta$ is from 10° to 5° when the angle $\alpha$ is from 15° to 10°. These ranges of the angles $\beta$ and $\alpha$ ensure that the blanket 4 first contacts the magnetic layer 9 at the point at which the coated web changes direction, as indicated by arrow A above the deflecting roll 5. This may be readily achieved in practice by using a polyester film having a thickness of 20 to 100 $\mu$m, particulary 30 $\mu$m, as the blanket. Films having similar properties as regards adhesion, flexibility and weight may also be used for the purposes of the invention. The blanket 4 has, of course, at least the same width as the coated web 1.

The length of the blanket 4 is preferably such that it ends just before the point at which the greatest field strength is exerted on the layer 9 by the orienting device 70. This length $X_1 + X_2$ is preferably 65 mm in the case of a 30 $\mu$m thick polyester film and the above values of $\alpha$ and $\beta$. In this case the length $X_1$ (distance from holding means 3 to the first point of contact A) is 25 mm. The length $X_3$ of the magnetic orienting device 7 is about 100 mm. We have found that the deflecting roll 5 and the roll 6 should be arranged as near to the orienting device 7 as possible.

Folllowing orientation, which, as explained above, resides in the very advantageous combination of subjecting only the magnetic layer to shear forces with magnetic orientation, the magnetic layer is dried in a suitable manner, for example by means of a hot-air dryer 8 located downstream of the orientation device or by means of electromagnetic radiation applied within the magnetic field downstream of the end of the blanket 4.

In the following Table, the results of measurements on various types of tape are listed, these showing an increase in the orientation ratios of the magnetic tapes of from 2 to 12%.

TABLE

| | | | Orientation Factor | | |
|---|---|---|---|---|---|
| Commercial BASF Tape | Layer Thickness $\mu$m | Film Thickness $\mu$m | without film 4 | with film 4 | Increase in % |
| 1. Chromium dioxide tape | 6 | 12 | 1.70 | 1.86 | 9.4 |
| 2. Iron oxide Tape 4612 | 12 | 36 | 1.37 | 1.53 | 11.7 |
| 3. Iron oxide Tape LGR | 14 | 15 | 1.69 | 1.73 | 2.4 |
| 4. Iron oxide Tape VAGH | 10 | 15 | 1.96 | 2.03 | 3.5 |
| 5. Iron oxide Tape Pioloform | 11 | 15 | 1.52 | 1.67 | 9.9 |

We claim:

1. An apparatus for the manufacture of magnetic recording tape, including:
   means for coating a moving web of non-magnetizable tape base material with a layer of fluid magnetic dispersion comprising a mixture of anisotropic magnetic particles in a binder,
   a deflecting roll disposed downstream of said coating means,
   means for conveying said web past said coating means upwardly towards said deflecting roll in an inclined plane, said deflecting roll causing said web to change direction to a horizontal plane,
   a magnetic orienting device disposed downstream of said deflecting roll and having at least one pair of poles adjacent said horizontal plane, the poles of said pair extending perpendicularly to and being spaced lengthwise of said web so as to orient said magnetic particles in a direction parallel to the surface of the web,
   a flexible blanket mounted between the coating means and the magnetic orienting device so as to provide a portion in sliding contact with the magnetic layer,
   the first line of contact of the blanket with said layer being near the deflecting roll and the length of the blanket being so correlated with the position of said magnetic orienting device that the blanket extends to a point between said lengthwise spaced poles, and
   drying means disposed downstream of the last-mentioned point.

2. An apparatus as claimed in claim 1, wherein the angle between the inclined plane and the horizontal plane is from 165° to 170°.

3. An apparatus as claimed in claim 1 or 2, wherein the blanket is a polyester film having a thickness of 20 to 100 μm.

4. An apparatus as claimed in claim 1, in which the length of the blanket is so correlated with the position of the megnetic orienting device that the blanket extends to a location substantially just prior to the point at which the greatest magnetic field strength is exerted by said magnetic orienting device on said magnetic particles.

* * * * *